(12) United States Patent
Goranov

(10) Patent No.: US 9,705,861 B2
(45) Date of Patent: Jul. 11, 2017

(54) METHOD OF AUTHORIZING A PERSON, AN AUTHORIZING ARCHITECTURE AND A COMPUTER PROGRAM PRODUCT

(75) Inventor: Boris Petrov Dokov Goranov, Rotterdam (NL)

(73) Assignee: UBIQU B.V., Rotterdam (NL)

(*) Notice: Subject to any disclaimer, the term of this patent is extended or adjusted under 35 U.S.C. 154(b) by 321 days.

(21) Appl. No.: 13/701,639

(22) PCT Filed: Jun. 3, 2011

(86) PCT No.: PCT/NL2011/050395
§ 371 (c)(1),
(2), (4) Date: Jan. 25, 2013

(87) PCT Pub. No.: WO2011/152729
PCT Pub. Date: Dec. 8, 2011

(65) Prior Publication Data
US 2013/0117815 A1    May 9, 2013

(30) Foreign Application Priority Data

Jun. 4, 2010    (NL) .................................... 2004825

(51) Int. Cl.
*G06F 17/30* (2006.01)
*H04L 29/06* (2006.01)
*G07C 9/00* (2006.01)

(52) U.S. Cl.
CPC .......... *H04L 63/08* (2013.01); *G07C 9/00111* (2013.01); *G07C 9/00182* (2013.01)

(58) Field of Classification Search
None
See application file for complete search history.

(56) References Cited

U.S. PATENT DOCUMENTS

| 5,657,388 A | 8/1997 | Weiss |
| 6,038,666 A | 3/2000 | Hsu et al. |
| 6,064,316 A * | 5/2000 | Glick et al. .................. 340/5.65 |

(Continued)

FOREIGN PATENT DOCUMENTS

| AU | 1382501 A | 5/2001 |
| CN | 1505762 A | 6/2004 |

(Continued)

*Primary Examiner* — Farid Homayounmehr
*Assistant Examiner* — Olanrewaju Bucknor
(74) *Attorney, Agent, or Firm* — Miller, Matthias & Hull LLP

(57) ABSTRACT

The invention relates to a method for authorizing a person. The method comprises the step of receiving authentication data from a personal authentication device transmitting said data to a reader associated with a central authorization system. Further, the method comprises the steps of including the received authentication data in a request message and transmitting the request message to the central authorization system, receiving the request message at the central authorization system and retrieving the authentication data from the request message. The method also comprises the steps of performing an authentication process at a central authentication system using said reader authentication data and executing an authorization process at the central authorization system based on the authentication process result.

17 Claims, 5 Drawing Sheets

(56) References Cited

U.S. PATENT DOCUMENTS

| | | | |
|---|---|---|---|
| 6,185,773 B1* | 2/2001 | Goedde | 340/540 |
| 6,329,909 B1* | 12/2001 | Siedentop | B60R 25/04 307/10.2 |
| 6,347,486 B1* | 2/2002 | Badillet | 49/394 |
| 6,456,900 B1* | 9/2002 | Kakuta | 700/233 |
| 6,807,534 B1* | 10/2004 | Erickson | G06F 21/10 380/282 |
| 7,257,708 B2* | 8/2007 | Guthery | G06F 21/31 705/41 |
| 7,530,113 B2* | 5/2009 | Braun | G05B 19/042 700/237 |
| 7,766,223 B1* | 8/2010 | Mello et al. | 235/379 |
| 8,112,066 B2* | 2/2012 | Ben Ayed | G06Q 20/108 455/41.1 |
| 8,269,599 B2* | 9/2012 | Goza | 340/5.2 |
| 8,928,454 B2* | 1/2015 | Brown et al. | 340/5.2 |
| 2002/0014955 A1 | 2/2002 | Klitsgaard | |
| 2004/0021552 A1* | 2/2004 | Koo | G07C 9/00087 340/5.53 |
| 2004/0153421 A1 | 8/2004 | Robinson | |
| 2005/0038741 A1* | 2/2005 | Bonalle | G06Q 10/025 705/40 |
| 2005/0044386 A1 | 2/2005 | Libin et al. | |
| 2005/0105734 A1 | 5/2005 | Buer et al. | |
| 2005/0109835 A1* | 5/2005 | Jacoby | G06Q 20/04 235/379 |
| 2005/0138380 A1 | 6/2005 | Fedronic et al. | |
| 2005/0179349 A1* | 8/2005 | Booth et al. | 312/257.1 |
| 2006/0170533 A1 | 8/2006 | Chioiu et al. | |
| 2007/0200665 A1 | 8/2007 | Studerus | |
| 2007/0271596 A1* | 11/2007 | Boubion et al. | 726/3 |
| 2008/0052541 A1* | 2/2008 | Ginter | G06F 21/10 713/194 |
| 2009/0184801 A1 | 7/2009 | Bliding et al. | |
| 2009/0210930 A1 | 8/2009 | Lexcellent et al. | |
| 2010/0065629 A1* | 3/2010 | Wentker | G06Q 20/40 235/382 |
| 2011/0145897 A1* | 6/2011 | Tyree | 726/6 |
| 2011/0270757 A1* | 11/2011 | Hammad | G06Q 30/06 705/44 |
| 2012/0066632 A1* | 3/2012 | Sundermeyer | G08B 25/003 715/771 |
| 2013/0117815 A1 | 5/2013 | Goranov | |

FOREIGN PATENT DOCUMENTS

| | | |
|---|---|---|
| EP | 0788287 A2 | 8/1997 |
| EP | 1232404 A1 | 8/2002 |
| EP | 1585067 A1 | 10/2005 |
| EP | 2577616 A1 | 4/2013 |
| GB | 2417858 A | 3/2006 |
| JP | 2007251557 A | 9/2007 |
| NL | 1015501 C2 | 12/2001 |
| NL | 1032473 C2 | 3/2008 |
| WO | WO-01/37004 A1 | 5/2001 |
| WO | WO-03/069566 A2 | 8/2003 |
| WO | WO-2006/021047 A1 | 3/2006 |
| WO | WO-2007/126375 A1 | 11/2007 |
| WO | 2011152729 A1 | 12/2011 |

\* cited by examiner

METHOD OF AUTHORIZING A PERSON, AN AUTHORIZING ARCHITECTURE AND A COMPUTER PROGRAM PRODUCT

CROSS-REFERENCE TO RELATED APPLICATIONS

This application is a 35 USC §371 U.S. national stage filing of International Patent Application No. PCT/NL2011/050395 filed on Jun. 3, 2011, which claims priority under the Paris Convention and 35 USC §119 to Netherland Patent Application No. 2004825, filed on Jun. 4, 2010.

FIELD OF THE DISCLOSURE

The present invention relates to a method of authorizing a person, comprising the step of receiving authentication data from a personal authentication device transmitting said data to a reader associated with a central authorization system.

BACKGROUND OF THE DISCLOSURE

Central authorization systems are known for authorizing users of a personal authentication device, such as a smart card, to have access to a building or to withdraw money from a bank, for example. Generally, the readers associated with a central authorization system include a processor and a memory for verifying whether the user of the personal authentication device is authorized to have access to the system.

However, the application of smart readers is relatively costly. On the other hand, reader systems are known including a limited number of individual readers, e.g. four readers, that are connected to a control unit. The control unit includes a processor and a memory for performing the verifying process. The control unit is connected to a central authorization system.

It is noted that American patent publications US 2007/0200665 and US 2006/0170533 each disclose an access control system including a central authorization system that is arranged for checking telephone data with a pre-loaded list of authorized telephones.

Such closed system are less flexible for application of personal authentication devices that are unknown to the central authorization system.

SUMMARY OF THE DISCLOSURE

It is an object of the invention to provide a method of authorizing a person wherein one of the disadvantageous identified above is reduced. In particular, it is an object of the invention to provide a method wherein relatively simple readers can be applied and wherein authorization can be granted to users of personal authentication devices that are unknown to the central authorization system. Thereto, the method according to the invention includes further the steps of including the received authentication data in a request message and transmitting the request message to the central authorization system, receiving the request message at the central authorization system and retrieving the authentication data from the request message, performing an authentication process at a central authentication system using said authentication data, and executing an authorization process at the central authorization system based on the authentication process result.

By simply including, at the reader, the received authentication data in a request message, the reader is not required to perform any identification process on the data. As a consequence, the reader can be implemented in a low performance, low cost manner. Further, due to the simple reader structure, the authorizing process is flexible in terms of transmitting data from personal authentication devices that are associated with an authentication system that is unknown to the central authorizing system. Users of a personal authentication device that is not entered on a list of the central authorization system, but is known in the authentication system, have access, thereby providing an elegant and flexible authorization scheme.

Preferably, the step of performing an authentication process includes the steps of generating a query message including the authentication data and transmitting the query message to a central authentication system associated with the person authentication device, verifying the query message at the central authentication system by checking the authentication data in the query message, and generating a query response message containing data associated with the personal authentication device and transmitting the query response message to the central authorization system.

Similarly, the step of executing an authorization process may include the steps of verifying the query response message at the central authorization system by checking the data associated with the personal authentication device, generating an authorization message if the verification of the query response was successful, and transmitting the authorization message to an actuator associated with the central authorization system.

By providing a transparent communication path, also called "tunnel", between the personal authentication device and the central authentication system on the one hand, and a transparent communication path, also called "tunnel", between the reader and central authorization system on the other hand, the central authorization system can be dedicated to communicate with the reader and the actuator, while the central authentication system communicates with the personal authentication device. In this context it is noted that the concept "communication" means in this context meaningful exchange of information, not merely forwarding data. However, in practical implementations of the method according to the invention, a message communicated between the reader and the central authorization system may be forwarded via a component of the authentication network, such as the personal authentication device.

According to an aspect of the invention, the process of identifying a user (identity or capacity) is performed at a central authentication system, while a process of verifying whether said user (identity or capacity) is authorized to have access to a physical space and/or to information is performed separately in an authorization system. As a result, the readers can be implemented with minimal functionality, thereby reducing costs, improving reliability and rendering the set-up of a reader infrastructure easier. Advantageously, by storing the personal authentication device information centrally, storing, protecting and managing said information becomes simpler. Further, by using the specified message structure between the central authentication device and the central authorization device, a desired, efficient interaction is obtained providing a flexible method of authorizing a person.

The invention also relates to an authorizing architecture.

Further, the invention relates to a computer program product. A computer program product may comprise a set of computer executable instructions stored on a data carrier, such as a CD or a DVD. The set of computer executable instructions, which allow a programmable computer to carry out the method as defined above, may also be available for downloading from a remote server, for example via the Internet.

Other advantageous embodiments according to the invention are described in the following claims.

BRIEF DESCRIPTION OF THE DRAWINGS

By way of example only, embodiments of the present invention will now be described with reference to the accompanying figures in which.

DETAILED DESCRIPTION OF THE DISCLOSURE

It is noted that the figures show merely a preferred embodiment according to the invention. In the figures, the same reference numbers refer to equal or corresponding parts.

Figure 1:
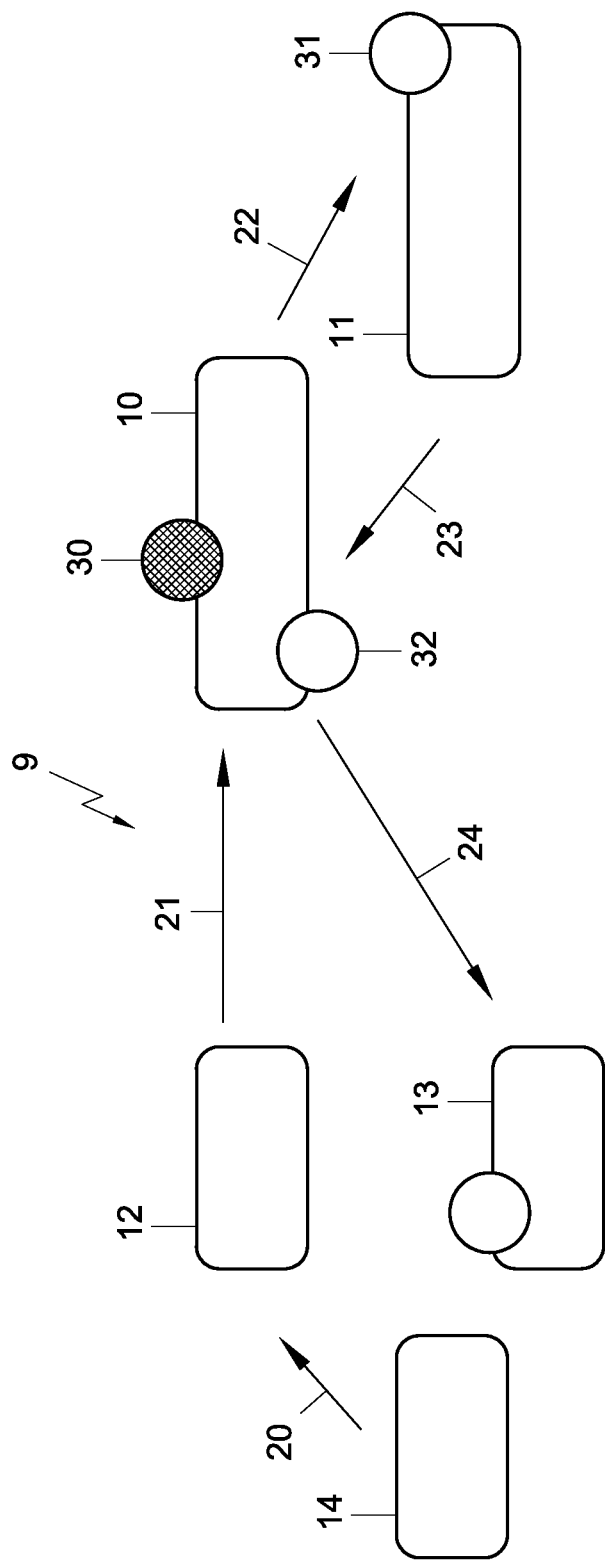
FIG. 1 shows a data flow diagram corresponding to a first embodiment of a method according to the invention.

FIG. 1 shows a data flow diagram corresponding to a first embodiment of a method according to the invention. The data flow diagram shows a number of data processing components forming an authorization architecture. The architecture 9 includes a central authorization system 10 for authorizing a person, and a central authentication system 11 communicatively connected to the central authorization system 10. Further, the architecture 9 includes a reader 12 and an actuator 13 associated with the central authorization system 10.

The central authorization system 10 provides access to a physical space, such as a building or a room, and/or to information, such as data related to bank accounts. Via the reader 12, information is transmitted to the central authorization system 10. After having performed an authorization process, as explained in more detail below, the central authorization system 10 can permit the actuator 13 to actuate, e.g. by opening a door and/or by providing information on a display.

The central authentication system 11 performs a check on the identity and/or capacity of a personal authentication device 14 communicating with the reader 12. According to an aspect of the invention, the activities of the central authorization system 10 and the central authentication system 11 are coordinated to provide a highly efficient authorization process.

During use of the authorizing architecture 9, the personal authentication device 14, e.g. a cellular phone, PDA, smart card, token or electronic key, transmits authentication data 20 to the reader 12. The data 20 can include personal data, such as the name of the user of the personal authentication device 14. The authentication data include identity data and/or capacity data. The reader 12 receives said data 20. Then, the reader 12 generates a request message 21 by including said received authentication data in a message, and transmits the request message 21 to the central authorization system 10. The process of generating the request message 21 can include adding localization data or additional ambient information to the received authentication data 20. As an example, the location of the room where the reader 12 is located or a reader identification number can be added in the request message 21. However, the request message 21 can, as an alternative to explicitly including localization data or additional ambient information, also include information regarding the reader in an implicit way, e.g. if only one reader 12 is associated to the central authorization system 10 or if a reader specific protocol is applied for the request message 21. The request message 21 can be transmitted to the central authorization system 10 e.g. via a physical communication line interconnecting the reader 12 and the central authorization system 10, or via a wireless connection. In order to protect data, especially during wireless transmission, the step of generating a request message can include a step of protecting data, e.g. for the purpose of determining integrity of the message, for encrypting data to counteract that unauthorized parties get knowledge of data included in the message, and/or for validating the transmitter of the message.

As a next step, the request message 21 is received at the central authorization system 10. From the request message 21, the authentication data are retrieved, to at least partly identify the personal authentication device 14 interacting with the reader 12. The retrieval of the authentication data is denoted by a first disc 30 at the central authorization system 10. In the retrieval process, the request message 21 is subjected to a decrypting and/or verification process at the central authorization system 10, if the request message 21 has been protected. Then, an authentication process is performed. The authentication process includes that the central authorization system 10 generates a query message 22 including the authentication data. The query message 22 is transmitted to the central authentication system 11 for further processing. After receipt, the central authentication system 11 verifies the query message 22 by checking the authentication data included in the query message 22. The query message verification is denoted by a disc 31 at the central authentication system 11. In order to perform the verification, the authentication data can be compared with corresponding data in a central authentication database provided in the central authentication system 11. As an example, the database can include a list of tokens each corresponding with unique authentication data and a specific identify or capacity allocated to the user of said tokens.

Further, in this process, since a data transfer path is established between the token and the central authentication system, the central authentication system can communicate other data with the token, e.g. regarding updating information on the token etc.

If a positive match has been found between the authentication data and an identified personal authentication device in the central authentication system 11, a query response message 23 is generated containing data associated with the personal authentication device 14. The query response message 23 is transmitted back to the central authorization system 10, thus ending the authentication process.

At the central authorization 10, an authorization process is executed, including that the query response message 23 is verified by checking the data associated with the personal authentication device 14. The query response message verification is denoted by a second disc 32 at the central authorization system 10. Similarly, the data checking process can include a step of comparing said data with corresponding data in a central authorization database provided at the central authorization system 10.

If the verification has been successful, an authorization message 24 is generated and transmitted to the actuator 13, thus finalizing the authorization process. Then, the actuator 13 is authorized to start an authorized act. As an example, the actuator is arranged for operating a lock, switch, light or door, for dispensing a good, for making a transaction or paying, and/or for making a sound. As a further example, the actuator can provide access to transport systems, e.g. a system for starting the engine of a car, boat, air plane etc.

Figure 2:
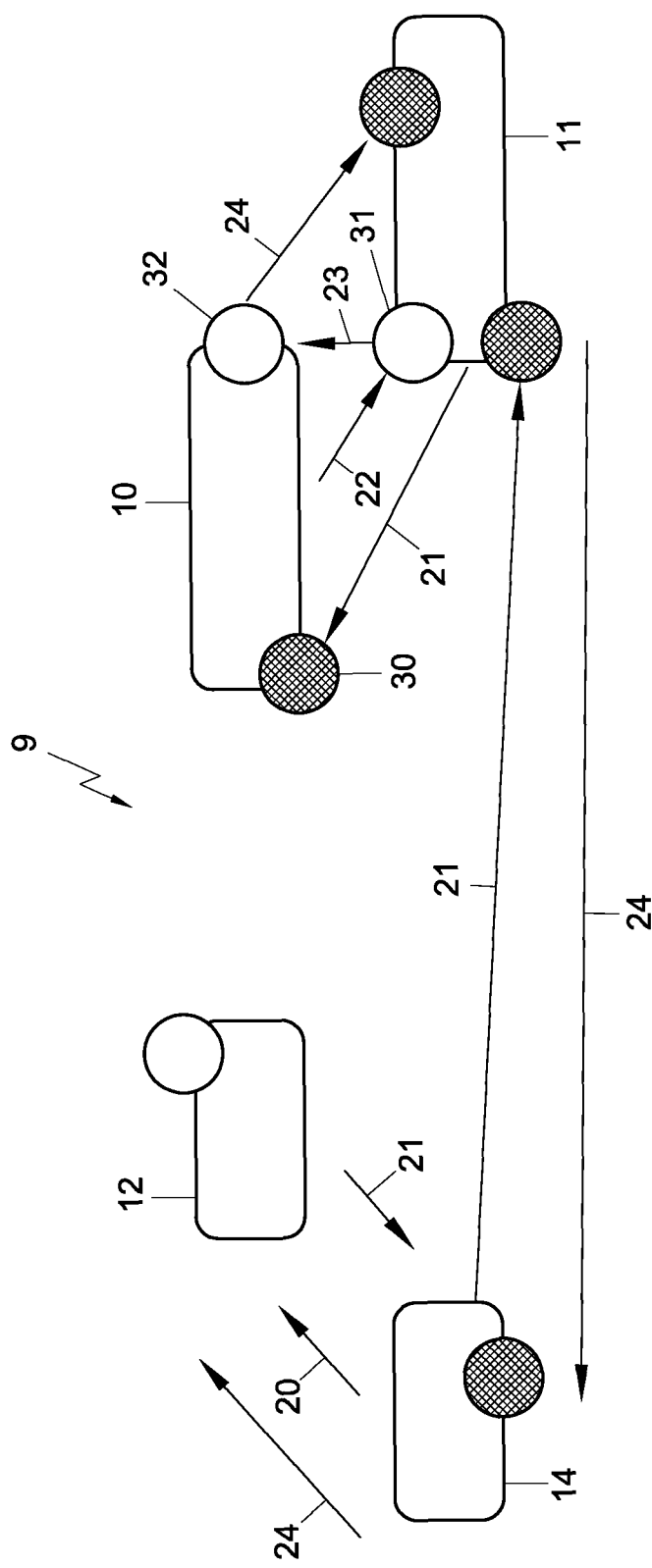
FIG. 2 shows a data flow diagram corresponding to a second embodiment of a method according to the invention.

FIG. 2 shows a data flow diagram corresponding to a second embodiment of a method according to the invention. Here, the request message 21 is transmitted to the central authorization system 10 via a path including the personal authentication device 14 and the central authentication system 11. In the shown configuration, the direct communication line between the reader 12 and the central authorization system 10 associated with the reader 12 is replaced by the virtual connection using the personal authentication device 14 and the central authentication system 11. The reader 12 can be placed stand-alone. Similarly, the authorization message 24 is transmitted from the central authorization system 10 via the central authentication system 11 and the personal authentication device 14 to the actuator (not shown). The actuator can be connected to the reader 12 or is arranged for direct receipt of the authorization message via the personal authentication device 14. It is noted that the physical path along which the message 24 is transmitted may include further communication points and/or path sections.

Figure 3:
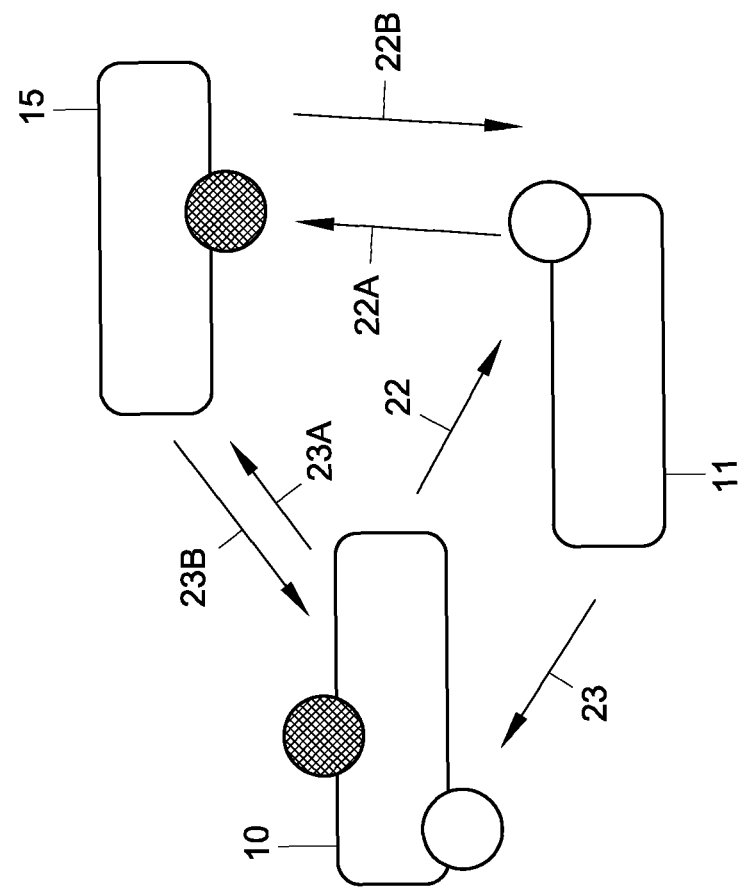
FIG. 3 shows a partial data flow diagram corresponding to a third embodiment of a method according to the invention.

FIG. 3 shows a partial data flow diagram corresponding to a third embodiment of a method according to the invention. Here, the authorization architecture 9 comprises a clearance system 15, e.g. for performing a fraud and/or guarantee check. In the shown example, additional verification request messages 22A, 23A are transmitted to the clearance system 15 by both the central authorization system 10 and authentication system 11, before generating and transmitting the query response message 23 and the authorization message 24, respectively. The respective message is generated and transmitted after receipt of a positive clearance message 22B, 23B.

Figure 4:
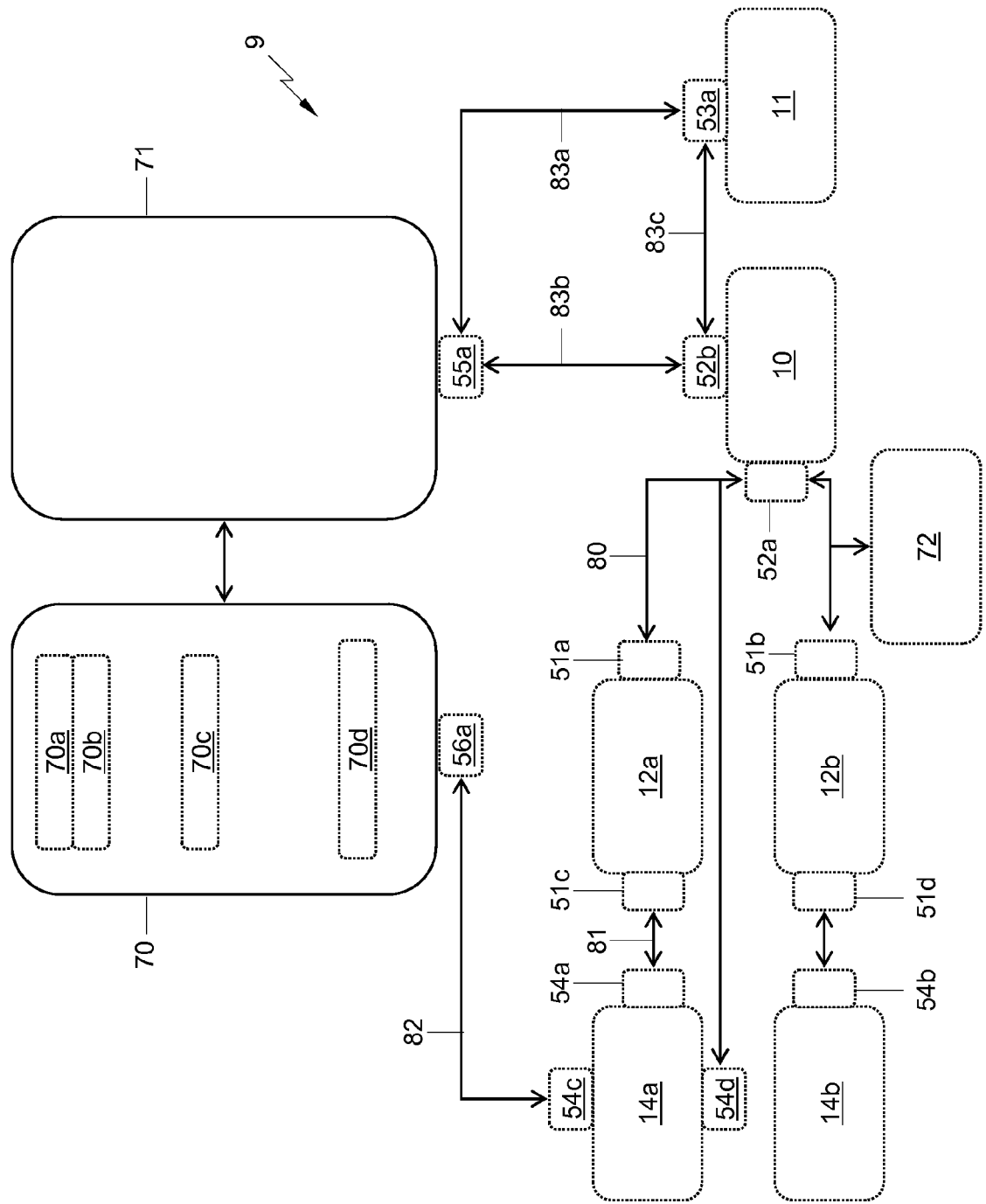
FIG. 4 shows a schematic view of an authorizing architecture according to the invention.

FIG. 4 shows a schematic view of an authorizing architecture 9 according to the invention. The architecture 9 comprises two readers 12a, 12b, a central authorization system 10, also called security centre, and an authentication system 11, also called key management system. Further, the architecture 9 includes a web user interface 70 and a server 71 for performing functionality that is offered in the web user interface, also called portal. As an example, the portal 70 includes a number of sites for offering services, viz. a sales site 70a, a client site 70b for privileged management by clients of the architecture, a supervisor site 70c for managing the services that are offered on the portal 70, and an activation site 70d for activating tokens, such as a mobile telephone, e.g. via an SMS message. It is noted that the portal 70 may also include more, less and/or other sites for offering services. The central authentication system 11 provides and manages key information that is associated with provided tokens 14a, 14b. Similarly, the central authorization system 10 communicates with the readers 12a, 12b, actuators and a back-up server 72. The back-up server 72 is a cache component for supporting data transfer on a local level when communication between the readers 12 and the central authorization system 10 has been interrupted.

A network 80, e.g. a local intranet or a global Internet, interconnects the readers 12, the security centre 10 and the back-up server 72. Thereto, the readers 12 and the security centre 10 are provided with an interface 51a,b; 52a. Optionally, a token 14a is also provided with an interface 54d for communication with the network 80. The reader 12a and the token 14a communicate via a specific communication line 81, e.g. blue tooth or infra red. Thereto, the reader and the token are provided with an interface 51c,d; 54a,b, respectively. Optionally, the token 14a also includes an interface for communicating, via a separate, preferably secured network 82 with the portal 70. Thereto, also the portal 70 is provided with an interface 56a. Further, the security centre 10, the key management system 11 and the server 71 are provided with corresponding interfaces 52b, 53a, 55a for mutual communication using a, preferably secured network 83a,b,c. The token is e.g. implemented as a mobile phone, j2me smart phone or ISO 14443 card. Apparently, the token can include other interfaces for communication.

In this context it is noted that the reader can be provided with a single or a multiple number of interfaces for communication with specific or different token types. Though FIG. 4 shows two readers, also another number of readers can be applied, e.g. circa ten readers or circa hundred readers. Further, a single or a multiple number of actuators can be applied, e.g. for opening a door or controlling a display unit. In principle, the architecture can include a multiple number of central authorization systems. Also, a multiple number of central authentication systems can be applied, e.g. for supporting a multiple number of providers that support a token based authorization. Further, other legacy token systems can be applied, and/or other actuator systems.

When a token communicates with a reader, authentication data is transmitted to the reader. Transmission can be initiated by the token or the reader. The initial authentication data can be sufficient for authorization. However, the central authorization system 10 may request further information, either initiated by the system 10 or by other systems, such as an authentication system 11. As a consequence, multiple messages including authentication data can be transmitted to the reader for processing. As a further option, the reader includes a positioning system, e.g. using a number of radio antennas, for determining whether the reader is located in a pre-determined location. The reader can be arranged to set up a connection or accepts a connection with the token only if the determined reader's position matches the pre-determined location near the token.

According to an aspect of the invention, the reader does not interpret authentication data that is transmitted by the token to the reader. As such, the reader does not identify a token type, a token type configuration or a token itself. The reader includes said information in a request message—without performing any identification—for transmission to the authorization system. As described above, the reader can optionally enrich the request message by further including additional information, such as interface type of token, location, time and/or encrypting features.

Figure 5:
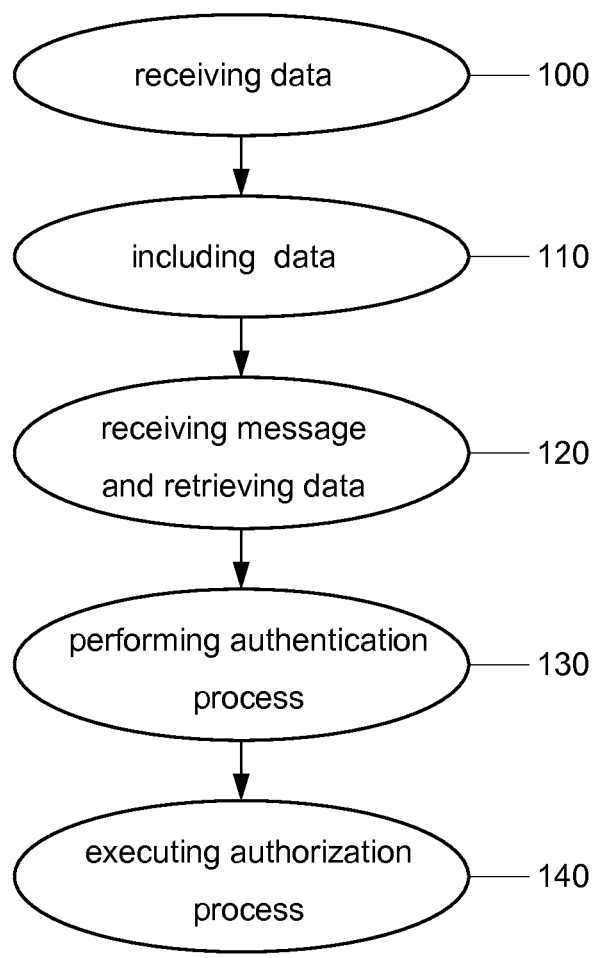
FIG. 5 shows a flow chart of an embodiment of a method according to the invention.

FIG. 5 shows a flow chart of an embodiment of the method according to the invention. A method is used for authorizing a person. The method comprises a step of receiving (100) authentication data from a personal authentication device transmitting said data to a reader associated with a central authorization system, a step of including (110) the received authentication data in a request message and transmitting the request message to the central authorization system, a step of receiving (120) the request message at the central authorization system and retrieving the authentication data from the request message, a step of performing (130) an authentication process at a central authentication system using said reader authentication data, and a step of executing (140) an authorization process at the central authorization system based on the authentication process result.

The method of authorizing a person can be performed using dedicated hardware structures, such as FPGA and/or ASIC components. Otherwise, the method can also at least partially be performed using a computer program product comprising instructions for causing a processor of the computer system to perform the above described steps of the method according to the invention. All steps can in principle be performed on a single processor. However it is noted that in advantageous embodiments according to the invention, groups of steps are performed on separate processors. As an example, the step of receiving (120) the request message and retrieving the authentication data from the message, and the step of executing (140) an authorization process can be performed on a processor associated with the central authorization system.

It will be understood that the above described embodiments of the invention are exemplary only and that other embodiments are possible without departing from the scope of the present invention. It will be understood that many variants are possible.

Such variants will be apparent for the person skilled in the art and are considered to lie within the scope of the invention as defined in the following claims.

The invention claimed is:

1. A method of authorizing a person, comprising the steps of:
   receiving authentication data from a personal authentication device transmitting said authentication data to a reader associated with a central authorization system;
   including, by the reader, the received authentication data in a request message and transmitting, by the reader, the request message to the central authorization system;
   transmitting the request message to the central authorization system via the personal authentication device and a central authentication system;
   receiving the request message at the central authorization system and retrieving the authentication data from the request message;
   performing an authentication process at a central authentication system using said authentication data;
   executing an authorization process at the central authorization system based on the authentication process result; and
   executing an authorization process at the central authorization system based on the authentication process result, wherein performing an authentication process includes generating a query message including the authentication data and transmitting the query message to the central authentication system associated with the personal authentication device, verifying the query message at the central authentication system by checking the authentication data in the query message, verifying the authentication data, generating an authorization message if the verification of the authentication data was successful and transmitting the authorization message to an actuator associated with the central authorization system.

2. The method according to claim 1, wherein the authentication process includes identifying an identity or capacity.

3. The method according to claim 2, wherein the authorization process includes checking whether the identified identity or capacity is authorized to have access to a physical space and/or to information.

4. The method according to claim 1, wherein the personal authentication device includes a cellular phone, PDA, smart card, token or electronic key.

5. The method according to claim 1, wherein the actuator is arranged for operating a lock, switch, light or door, for dispensing a good or for making a sound.

6. The method according to claim 1, wherein the step of generating the request message includes adding localization data or additional ambient information to the received authentication data.

7. The method according to claim 1, wherein the step of generating a request message includes a step of protecting data.

8. The method according to claim 7, wherein the central authorization system is arranged for decrypting and/or verifying the request message.

9. The method according to claim 1, wherein the step of checking the authentication data in the query message comprises a step of comparing the authentication data with corresponding data in a central authentication database.

10. The method according to claim 1, wherein the step of checking, in the query response message, the data associated with the personal authentication device comprises a step of comparing the data associated with the personal authentication device with corresponding data in a central authorization database.

11. The method according to claim 1, comprising transmitting the request message to the central authorization system via the reader.

12. The method according to claim 1, wherein the central authentication system is arranged for communicating with a multiple number of central authorization systems.

13. The method according to claim 1, including a multiple number of central authentication systems.

14. The method according to claim 1, including generating and transmitting additional request messages to a clearing system.

15. An authorizing architecture, comprising a central authorization system for authorizing a person, at least one reader and at least one actuator, the reader and the actuator being associated with the central authorization system, further comprising a central authentication system communicatively connected to the central authorization system, wherein the architecture is arranged for performing the steps of:
   receiving authentication data from a personal authentication device transmitting said authentication data to a reader associated with the central authorization system;
   including, by the reader, the received authentication data in a request message and transmitting the request message, by the reader, to the central authorization system via the personal authentication device and the central authentication system;
   receiving the request message at the central authorization system and retrieving the authentication data from the request message;
   performing an authentication process at a central authentication system using said authentication data; and
   executing an authorization process at the central authorization system based on the authentication process result, wherein executing an authentication process includes generating a query message including the authentication data and transmitting the query message to the central authentication system associated with the personal authentication device, verifying the query message at the central authentication system by checking the authentication data in the query message, verifying the authentication data, generating an authorization message if the verification of the authentication data was successful and transmitting the authorization message to an actuator associated with the central authorization system.

16. The authorizing architecture according to claim 15, wherein the at least one reader includes a positioning system for determining whether the reader is located in a predetermined location.

17. A computer program product for authorizing a person, the computer program product comprising computer readable code stored on a non-transitory computer-readable medium for causing a processor to perform the steps of:

receiving authentication data from a personal authentication device transmitting said authentication data to a reader associated with a central authorization system;

including, at the reader, the received authentication data in a request message and transmitting the request message, by the reader, to the central authorization system via the personal authentication device and a central authentication system;

receiving the request message at the central authorization system and retrieving the authentication data from the request message;

performing an authentication process at a central authentication system using said authentication data; and executing an authorization process at the central authorization system based on the authentication process result, wherein executing an authentication process includes generating a query message including the authentication data and transmitting the query message to the central authentication system associated with the personal authentication device, verifying the query message at the central authentication system by checking the authentication data in the query message, verifying the authentication data, generating an authorization message if the verification of the authentication data was successful and transmitting the authorization message to an actuator associated with the central authorization system.

* * * * *